United States Patent
Kim et al.

(10) Patent No.: US 7,613,344 B2
(45) Date of Patent: Nov. 3, 2009

(54) SYSTEM AND METHOD FOR ENCODING AND DECODING AN IMAGE USING BITSTREAM MAP AND RECORDING MEDIUM THEREOF

(75) Inventors: Wook-Joong Kim, Daejeon (KR);
Myung-Seok Ki, Daejeon (KR);
Kyu-Heon Kim, Daejeon (KR);
Jin-Woong Kim, Daejeon (KR);
Euee-Seon Jang, Seoul (KR);
Sun-Young Lee, Seoul (KR);
Hyun-Jong Oh, Seoul (KR); Sung-Won Park, Seoul (KR); Jong-Woo Won, Seoul (KR)

(73) Assignees: Electronics and Telecommunications Research Institute, Daejeon (KR);
Industry-University Cooperation Foundation, Hanyang University, Seoul (KR)

( * ) Notice: Subject to any disclaimer, the term of this patent is extended or adjusted under 35 U.S.C. 154(b) by 576 days.

(21) Appl. No.: 10/581,874

(22) PCT Filed: Nov. 11, 2004

(86) PCT No.: PCT/KR2004/002917

§ 371 (c)(1),
(2), (4) Date: Jun. 5, 2006

(87) PCT Pub. No.: WO2005/055607

PCT Pub. Date: Jun. 16, 2005

(65) Prior Publication Data

US 2007/0172133 A1    Jul. 26, 2007

(30) Foreign Application Priority Data

Dec. 8, 2003   (KR) ............... 10-2003-0088541
Apr. 12, 2004  (KR) ............... 10-2004-0024923

(51) Int. Cl.
*G06K 9/36* (2006.01)
(52) U.S. Cl. .................................................. 382/232
(58) Field of Classification Search ......... 382/232–233, 382/236, 238–240, 244–253; 348/423.1, 348/500, 512, 515, 516; 375/240.02, 240.18, 375/240.2
See application file for complete search history.

(56) References Cited

U.S. PATENT DOCUMENTS 5,155,592 A * 10/1992 Verbiest et al. .......... 375/240.2

(Continued)

FOREIGN PATENT DOCUMENTS

EP         0933694        8/1999

(Continued)

OTHER PUBLICATIONS

Euee S. Jang et al: "Some results on local decoding of panoramic video (EE1)", ISO/IEC JTC1/SC29/WG11, MPEG2003/M10333, Dec. 2003, Hawaii USA.

*Primary Examiner*—Jose L Couso
(74) *Attorney, Agent, or Firm*—Ladas & Parry LLP

(57) ABSTRACT

Disclosed are a system and method for encoding and decoding an image. The image compression system includes an image segmentation unit (110) for segmenting a first image into a plurality of sub-images; a first encoding unit (120) for encoding the sub-images to output sub-image bitstreams; a BMAP construction unit (130) for calculating the quantity of information of each sub-image bitstream and generating BMAP information using the calculated quantity of information and information on construction of each sub-image; and a bitstream combining unit (150) for combining the sub-image bitstreams and BMAP information.

31 Claims, 12 Drawing Sheets

U.S. PATENT DOCUMENTS 5,581,361 A * 12/1996 You et al. .................. 386/46
6,542,546 B1 * 4/2003 Vetro et al. ............ 375/240.12
6,862,045 B2 * 3/2005 Morimoto et al. ........... 348/515
7,236,528 B1 * 6/2007 Nie et al. ............... 375/240.18

2004/0028130 A1 2/2004 May et al.

FOREIGN PATENT DOCUMENTS

WO    WO 2004 004363    1/2004

* cited by examiner

[Fig. 1]
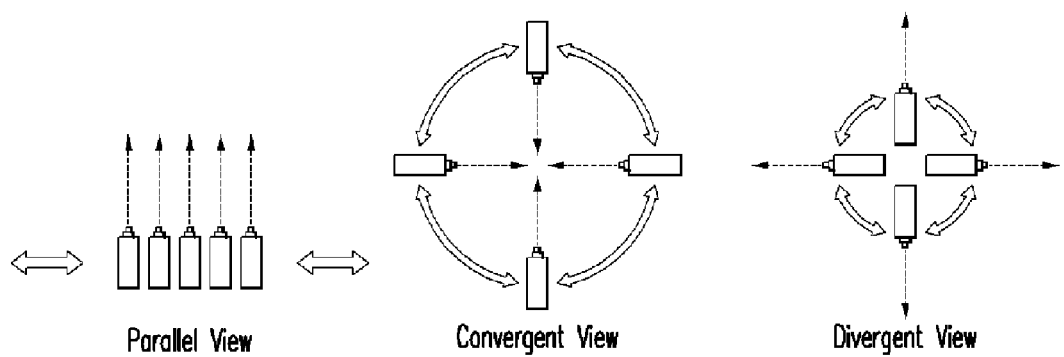

[Fig. 2]
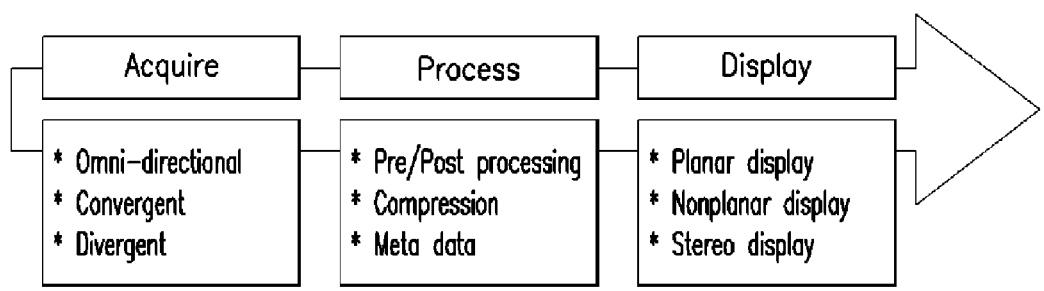

[Fig. 3]
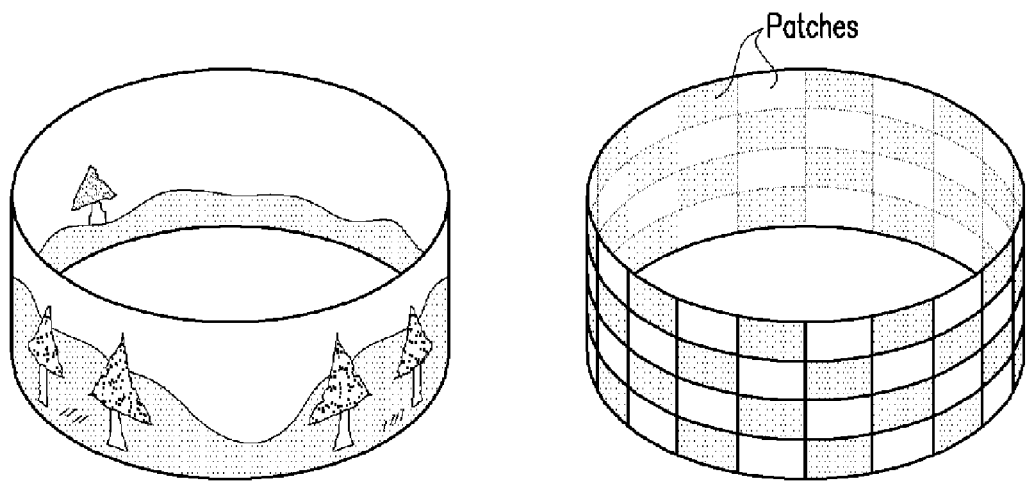

[Fig. 4]
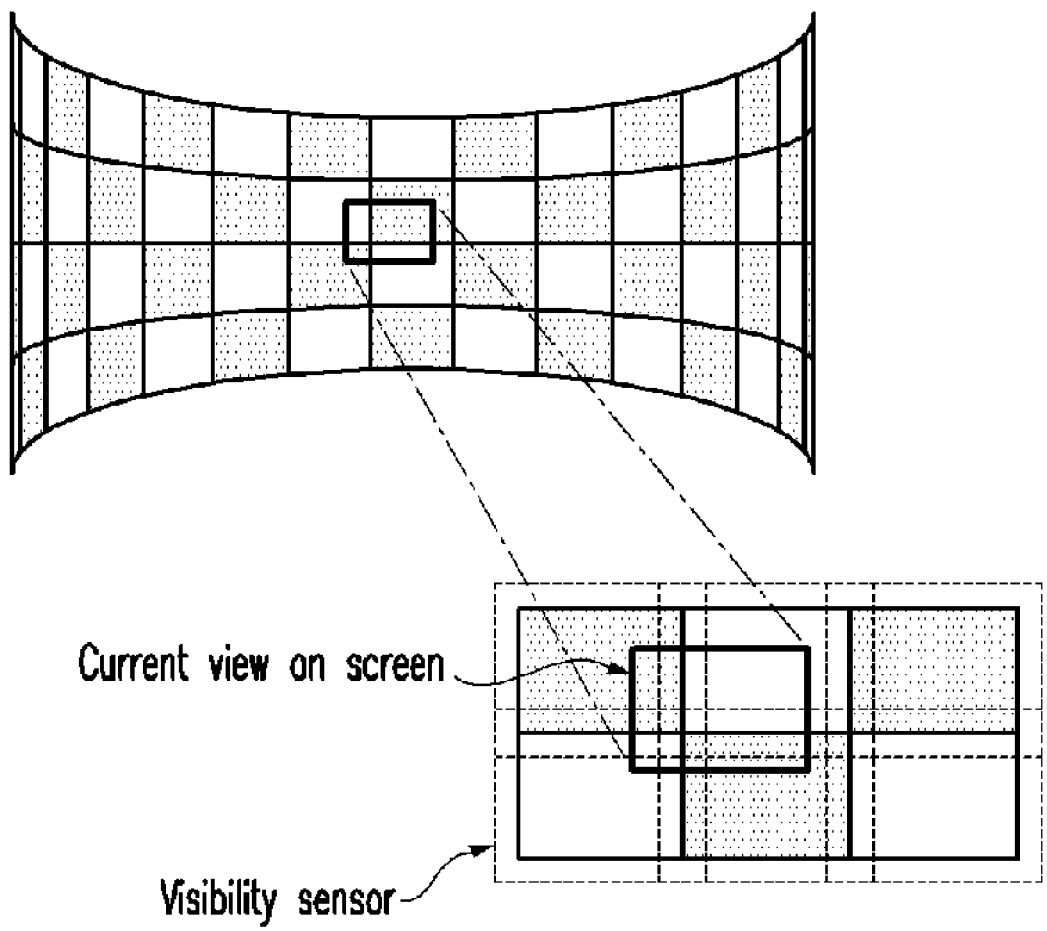

[Fig. 5]
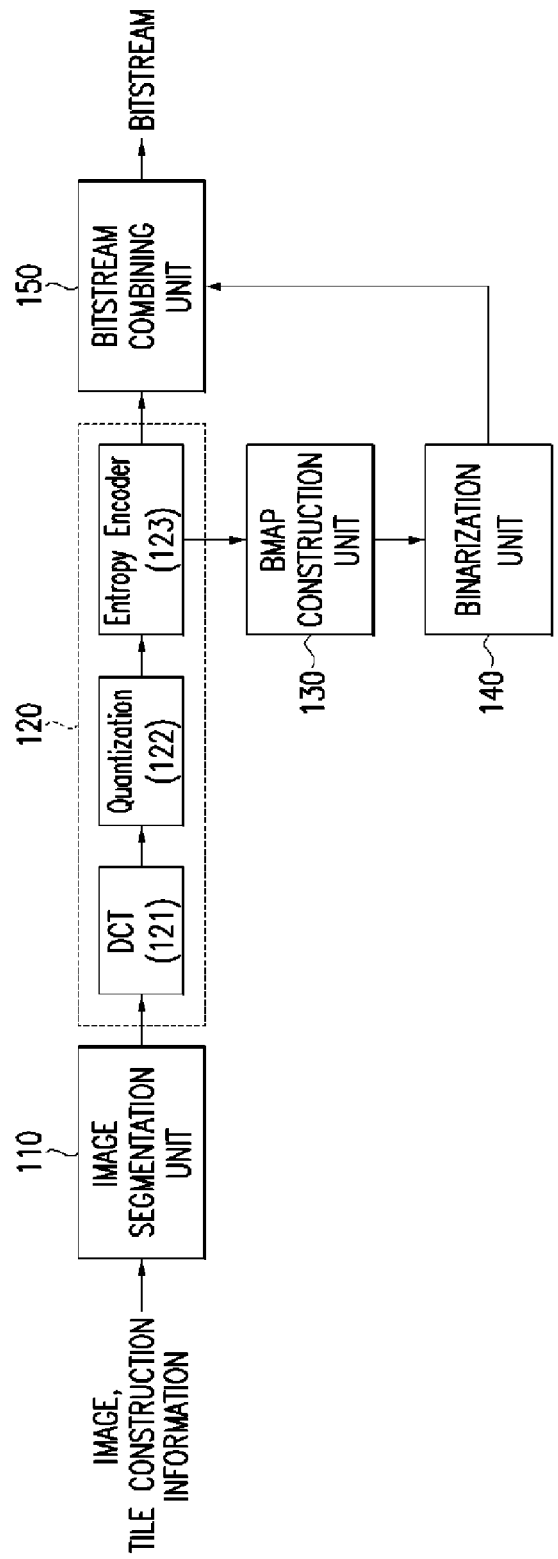

[Fig. 6]
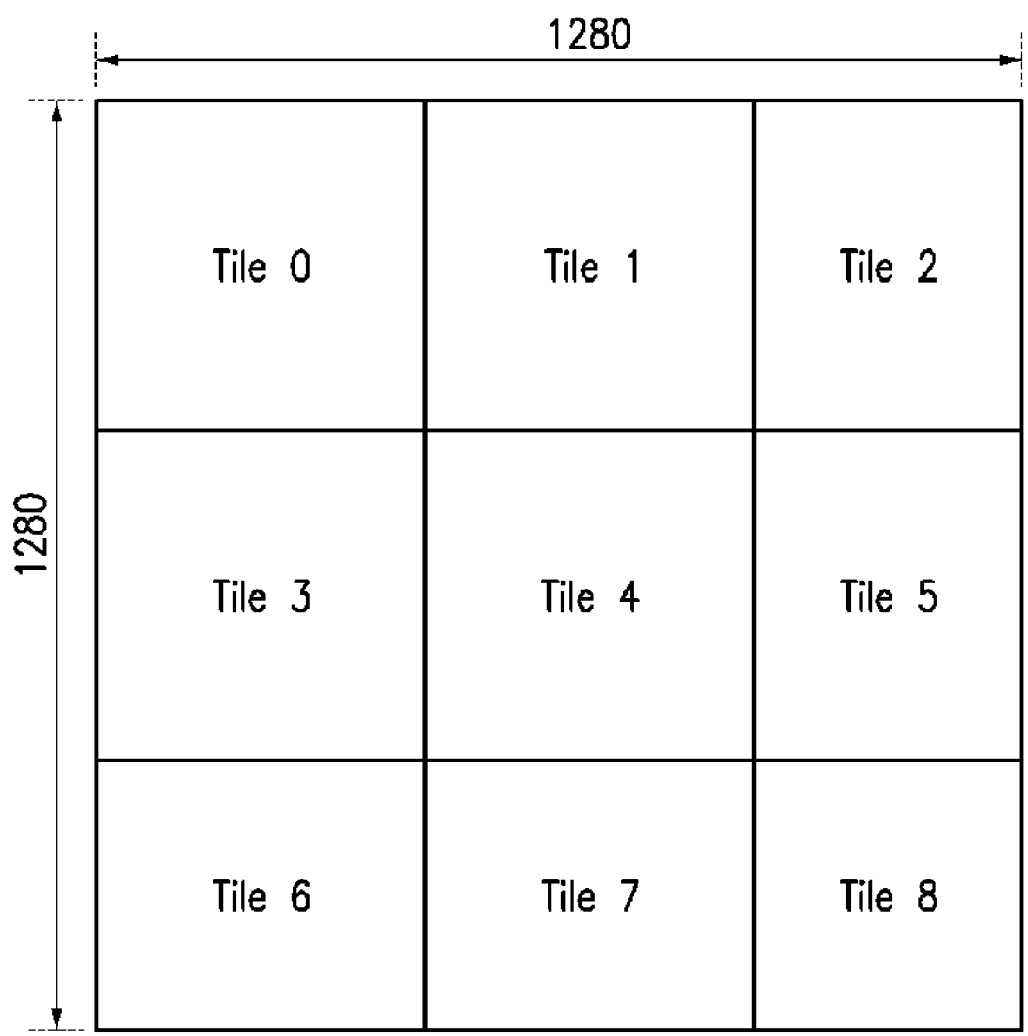

[Fig. 7]
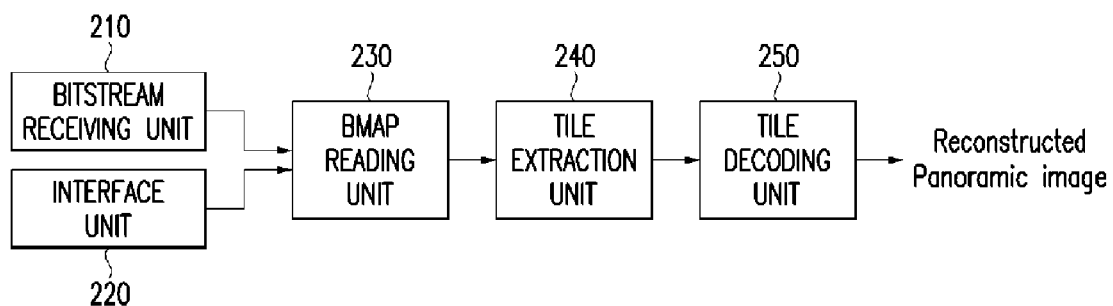

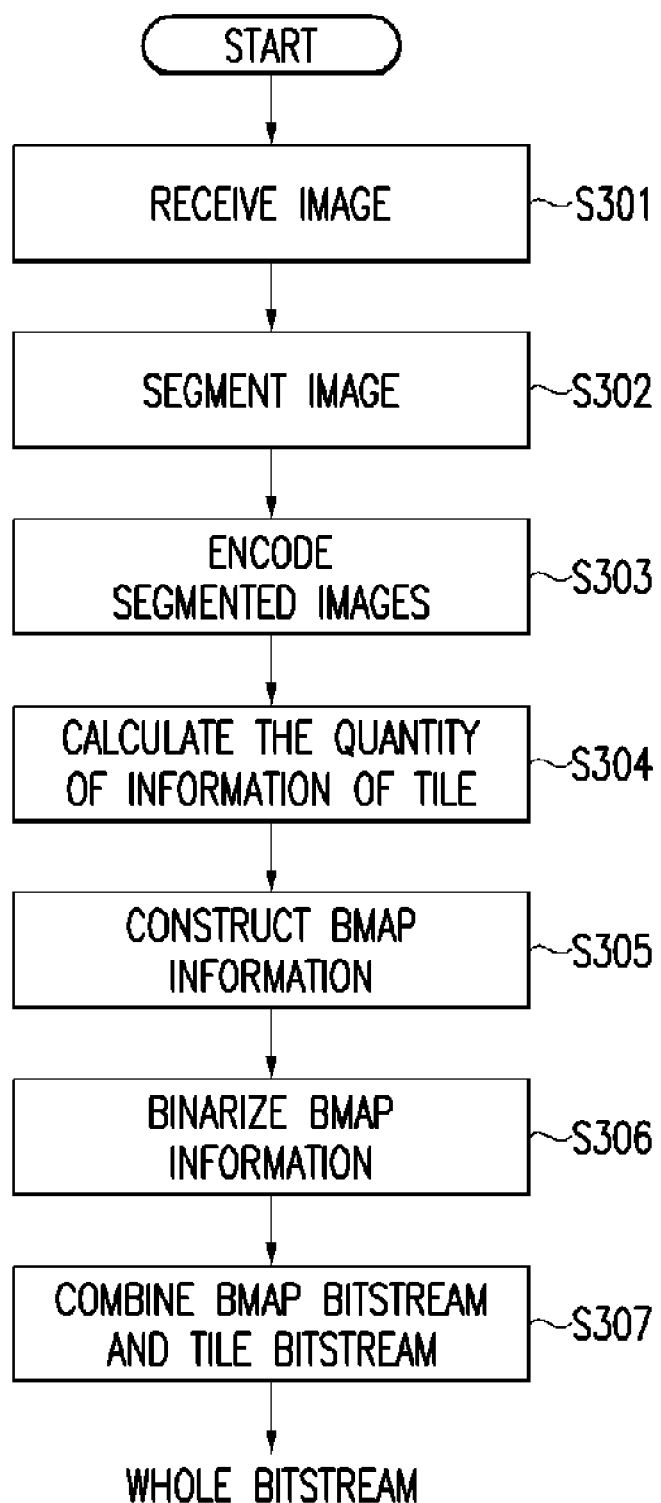
[Fig. 8]

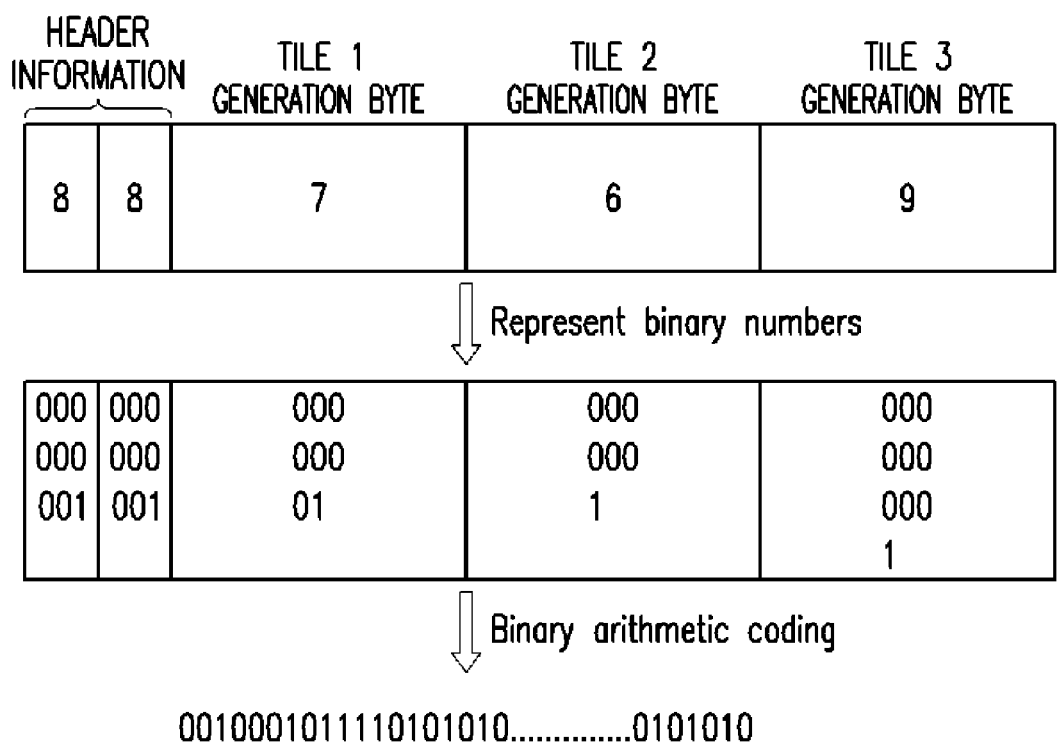
[Fig. 9]

[Fig. 10]
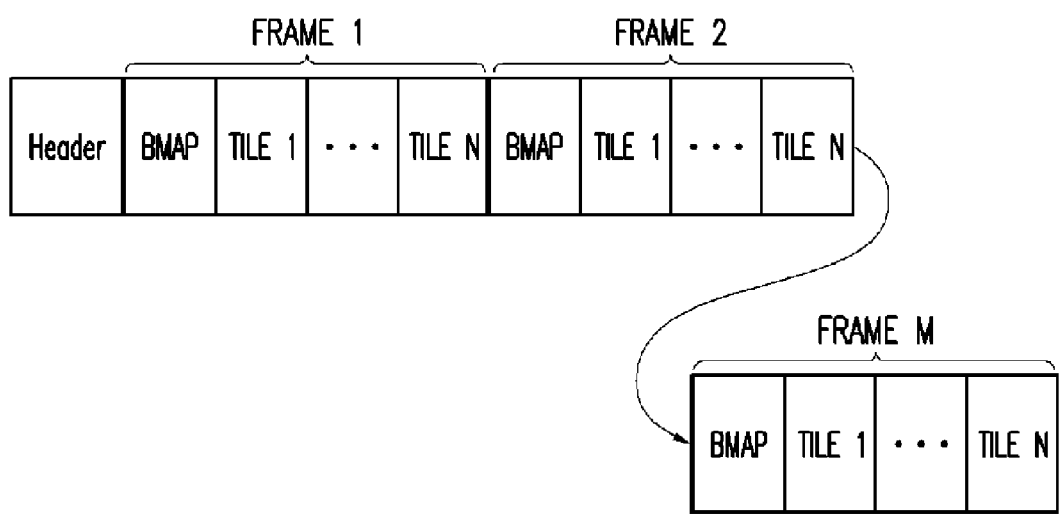

[Fig. 11]
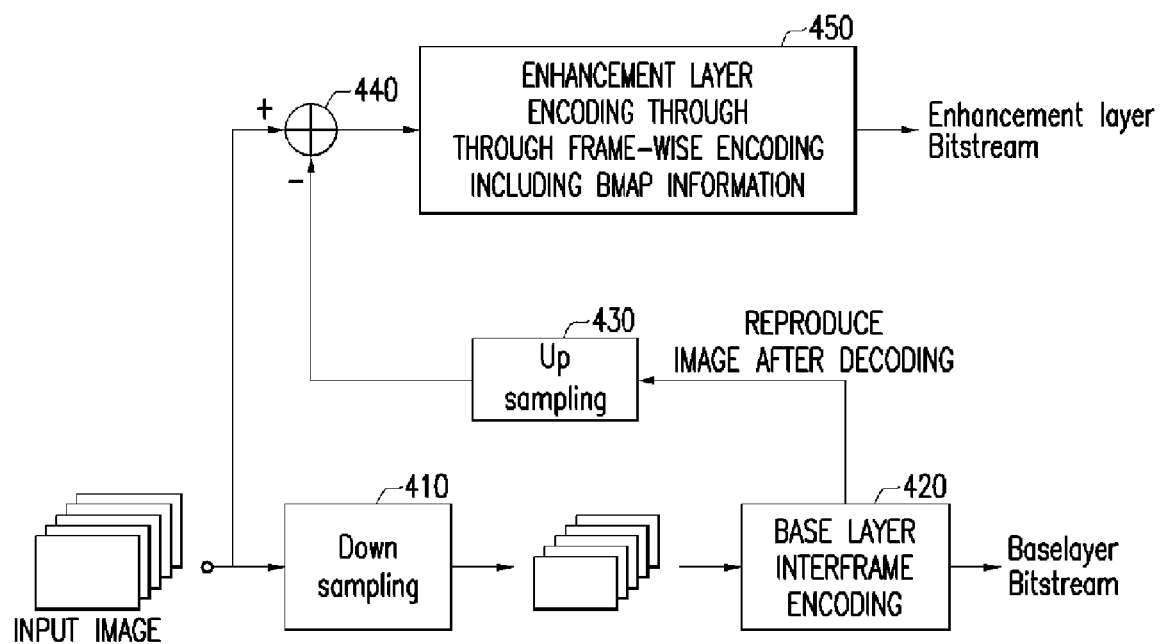

[Fig. 12]
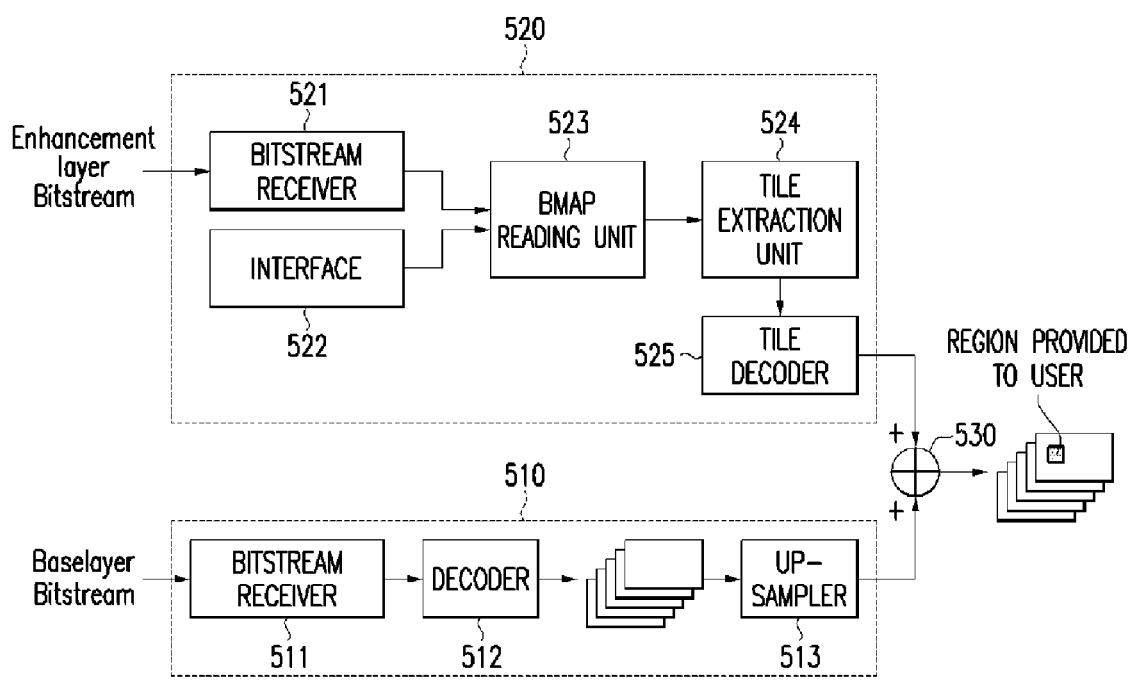

SYSTEM AND METHOD FOR ENCODING AND DECODING AN IMAGE USING BITSTREAM MAP AND RECORDING MEDIUM THEREOF

TECHNICAL FIELD

The present invention is related to a system and method for encoding and decoding images. More particularly, the present invention is related to a system and method for encoding and decoding a panoramic image using a bitstream map.

BACKGROUND ART

During the past 10 years, multimedia technology has undergone a dramatic change: from analog to digital. A digital media compression technique has been applied to various user products including digital TVs, DVDs and MP3's, etc, and has reduced a distance between a user and a contents provider by employing international standards, MPEG-1, MPEG-2 and MPEG-4, to the digital media compression technique. In particular, the MPEG-4, started standardization from 1993, has introduced a graphic object compression conception and has become general media of a new concept.

Recently, applications using three-dimensional video are gaining high spotlight. Three-dimensional video is classified into three categories: a panoramic video, a multi-view video and a stereo video. The stereo video is purposed to present stereo effect by providing different images to the left and right eyes of a viewer. The multi-view video provides different views of an object or scene by capturing at different view directions. The panoramic video, which also requires multiple capturing of scene, provides wider angle of a scene by combining multiple images of adjacent scenes.

FIG. 1 illustrates a method of obtaining three-dimensional video. Referring to FIG. 1, images obtained from multiple cameras using parallel or divergent views are combined to generate panoramic image data, whereas images from the convergent view are used for multi-view image data.

FIG. 2 illustrates a general process of panoramic video handling. Referring to FIG. 2, the process includes an acquirement step, a processing step and a displaying step. The acquirement step acquires a plurality of images using a single camera or multiple cameras. The acquired multiple images are synthesized into a single image and this process is called a registration. Herein, a characteristic value of a camera is an important factor in the registration. The synthesized image is encoded, transmitted, and stored during the processing step. A reproduced panoramic video is displayed on a planar or nonplanar display.

Important factors in the acquirement step for acquiring the panoramic video include the number of cameras used for obtaining images, three-dimensional geometry and orientation information on each camera. These factors are essential for obtaining high quality panoramic image.

FIG. 3 shows an example of a panoramic picture reproduced on a cylindrical display. The display can be designed as simple as a cylinder or a sphere, and it can be designed more complicated like as a polygonal mesh. A two-dimensional map is still used to represent pixels in a cylinder or a sphere. Accordingly, it is effective that a cylinder or sphere is constructed by combining multiple planes as patches shown in FIG. 3, in terms of the quantity of calculations.

Without regarding to the shapes of display, a panoramic picture requires a larger capacity compared to a single-view picture. Thus, efficient compression and video data streaming are important.

When acquisition and synthesis of images for generating a panoramic image are finished, the panoramic image is encoded so as to store or transmit. The panoramic video compression is not much different from conventional video compression, except for information on a polygonal model on which the panoramic image is displayed. However, a fundamental difference between the panoramic video and a general video is that the panoramic video requires a larger capacity and higher picture quality compared to the general video.

In the case of the panoramic video, a 'random access' functionality is an important factor together with high compression efficiency. The random access function enables to directly access a desired frame or region in an image sequence.

A general method of video compression includes an interframe coding method that encodes a current frame using data predicted from a previous frame in order to remove temporal redundancy between similar pictures in sequence. The interframe coding method increases compression efficiency but it is not advantageous in terms of random access.

A video system that requires random access should accept delay time corresponding to at least several frames in order to access an interframe-coded image. In particular, in the case of the panoramic video, the delay time represents a vast amount of calculations and large memory capacity because the panoramic video has high resolution. In other words, the panoramic video has a problem that compression efficiency and system complexity collide with each other.

Although the interframe coding method is replaced with an intraframe coding method in order to avoid the delay time corresponding to several frames, the delay time still remains depending on circumstances, for example, a period of time required for decoding a single frame can be problematical. A period of time required for decoding a single frame of a panoramic video having the size of 4K×4K is estimated to be 120 times a period of time required for decoding a frame in SIF (352×240) format. Accordingly, real-time decoding may be difficult to be implemented since this calculation may take too much time even if a plurality of decoders is simultaneously employed thereto.

FIG. 4 illustrates an example of reproduction of a local area through a partial decoding in random access. Unless a special method is designed for local region decoding, the whole panoramic image must be decoded first even it is displaying a part of the whole image, and it is wasting system resources.

For example, let's assume the case of encoding a panoramic image by the conventional compression techniques such as JPEG, JPEG1200, MPEG4 Video SP Intra coding, MPEG4 Video SP Inter coding, MPEG4 AVC Intra coding and MPEG4 AVC Inter coding. Because these techniques were designed without considering the functionality of local region decoding, when we display the panoramic image on a smaller display screen, the whole image must be decoded first, then stored in the memory of devices, and finally the region data is sent to display.

Therefore, no aforementioned codec satisfies both the compression efficiency and the random access functionality.

Thus, a new compression method satisfying these two functions is required to effectively compress the panoramic video.

DISCLOSURE OF INVENTION

Technical Problem

It is an advantage of the present invention to provide a system and method for encoding and decoding a panoramic image, which can process random access at a high speed while minimizing a decrease in compression efficiency in compression of the panoramic image.

Technical Solution

In one aspect of the present invention, an image compression system comprises an image segmentation unit for segmenting a first image into a plurality of sub-images; a first encoding unit for encoding the sub-images to output sub-image bitstreams; a BMAP construction unit for calculating the quantity of information of each sub-image bitstream and generating BMAP information using the calculated quantity of information and information on construction of each sub-image; and a bitstream combining unit for combining the sub-image bitstreams and BMAP information.

In another aspect of the present invention, an image decoding system comprises a bitstream receiving unit for receiving bitstreams of a first image including a plurality of sub-images; a BMAP reading unit for reading BMAP information included in the bitstreams and outputting information on a sub-image to be decoded among the plurality of sub-images; a sub-image extracting unit for extracting a bitstream corresponding to the sub-image to be decoded from the bitstreams using the information on the sub-image to be decoded; and a sub-image decoding unit for decoding the bitstream extracted by the sub-image extracting unit.

In another aspect of the present invention, an image compressing method comprises receiving a first image; segmenting the first image into a plurality of sub-images; encoding the sub-images to generate sub-image bitstreams; calculating the quantity of information of each sub-image and generating BMAP information using the calculated quantity of information and information on construction of each sub-image; combining the sub-image bitstreams and the BMAP information to generate frame bitstreams; and combining the frame bitstreams to form the bitstream of the first image.

In another aspect of the present invention, an image decoding method comprises receiving bitstreams of a first image including a plurality of sub-images; reading information on a sub-image corresponding to a region to be decoded among the plurality of sub-images using BMAP information included in the bitstreams; and extracting a bitstream corresponding to the sub-image to be decoded from the bitstreams.

In another aspect of the present invention, a recording medium storing an image compression program, comprises a function of receiving an image including at least one frame; a function of segmenting the image into a plurality of sub-images; a function of encoding the sub-images to generate sub-image bitstreams; a function of calculating the quantity of information of each sub-image bitstream and generating BMAP information using the calculated quantity of information and information on construction of each sub-image; and a function of combining the sub-image bitstreams and BMAP information to generate frame bitstreams.

In another aspect of the present invention, a recording medium storing an image decoding program, comprises a function of receiving bitstreams including a plurality of sub-images; reading information on a sub-image including a region to be decoded among the plurality of sub-images using BMAP information included in the bitstreams; and a function of extracting a bitstream corresponding to the sub-image to be decoded from the bitstreams.

BRIEF DESCRIPTION OF THE DRAWINGS

The accompanying drawings, which are incorporated in and constitute a part of the specification, illustrate an embodiment of the invention, and, together with the description, serve to explain the principles of the invention:

FIG. 1 shows a method of acquiring an image in a three-dimensional video processing;

FIG. 2 shows panoramic video processing steps;

FIG. 3 shows an example of a reproduced panoramic video;

FIG. 4 shows an example of reproduction of a local region through partial decoding of random access;

FIG. 5 is a block diagram of an image compression system according to an embodiment of the present invention;

FIG. 6 shows a panoramic image, which is input to an image segmentation unit and segmented into 8 tile images by the image segmentation unit, according to an embodiment of the present invention;

FIG. 7 is a block diagram of an image decoding system according to an embodiment of the present invention;

FIG. 8 is a flow chart showing an image compression method using JPEG standard according to an embodiment of the present invention;

FIG. 9 shows a process of binarizing BMAP information according to an embodiment of the present invention;

FIG. 10 illustrates a bitstream of an image having a plurality of frames;

FIG. 11 is a block diagram of an image compression system according to another embodiment of the present invention; and FIG. 12 is a block diagram of an image decoding system according to another embodiment of the present invention.

BEST MODE FOR CARRYING OUT THE INVENTION

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive. To clarify the present invention, parts which are not described in the specification are omitted, and parts for which similar descriptions are provided have the same reference numerals.

FIG. 5 is a block diagram of an image compression system according to an embodiment of the present invention.

Referring to FIG. 5, the image compression system includes an image segmentation unit 110, an encoding unit 120, a BMAP constructing unit 130, a binarization unit 140, and a bitstream combining unit 150. The image segmentation unit 110 segments an input panoramic image into a plurality of tile images using tile construction information. Here, the tile images represent sub images included in the whole image, and the tile construction information includes information on a segmentation form. In the case that each tile image has the same size, for instance, horizontal and vertical pixel values of each tile image become the tile construction information.

FIG. 6 shows a panoramic image segmented into eight of tile images by the image segmentation unit 110.

The encoding unit 120 compresses each of the tile images segmented by the image segmentation unit 110 to encode the tile images. According to an embodiment of the present invention, the encoding unit 120 can compress the images using JPEG coding. In this case, the encoding unit 120 includes a DCT (discrete cosine transform) unit 121 for discrete-cosine-transforming the tile images, a quantization unit 122 for quantizing the output signal of the DCT unit 121, and an entropy encoder 123. The internal configuration and operation of the encoding unit 120 are well known in the art so that detailed explanation therefor is omitted.

The BMAP construction unit 130 receives bitstreams of the tile images output from the encoding unit 120, calculates the quantity of information generated for each tile image and combines the quantity of generated information and the tile construction information to generate BMAP (bitstream map) information. BMAP information according to an embodiment of the present invention is as follows. The BMAP information includes header information, tile construction information and the quantity of bits generated for each tile image.

TABLE 1

| Header information | Tile construction information | Quantity of bits generated for tile 1 | ... | Quantity of bits generated for tile N |
|---|---|---|---|---|

The header of the BMAP information can include a synchronization bit, a start signal, a version number and so on. The header can include a variety of information items, as necessary.

The binarization unit 140 binarizes the BMAP information outputted from the BMAP construction unit 130. The bitstream combining unit 150 combines the bitstreams of the tile images outputted from the encoding unit 120 and the bitstream of the BMAP information outputted from the binarization unit 140 to form a final bitstream as follows.

TABLE 2

| Header information | BMAP | Tile 1 encoded bitstream | ... | Tile N encoded bitstream |
|---|---|---|---|---|

The header of the final bitstream can include various information items such as titles and color information on images. The bitstream of the BMAP information is placed prior to the tile image bitstream in the final bitstream according to the embodiment, but the position of the BMAP information can be changed.

A decoding system receives the bitstream and reads the BMAP information from the received bitstream such that the position of a tile image including a desired region can be easily recognized.

Accordingly, an image only in the desired region can be decoded and provided to the user. Consequently, the present invention can rapidly provide a user-desired image with a small quantity of calculations whereas the conventional method that decodes the whole panoramic image, stores the decoded image and then provides an image in a desired region to the user.

A bitstream obtained by encoding a tile image is called "a tile image bitstream," and a bitstream obtained by combining the tile image bitstream with the BMAP information and then actually transmitted is called "a whole image bitstream," hereinafter.

FIG. 7 is a block diagram of an image decoding system according to an embodiment of the present invention. Referring to FIG. 7, the image decoding system includes a bitstream receiving unit 210, an interface unit 220, a BMAP reading unit 230, a tile extracting unit 240, and a tile decoding unit 250.

The bitstream receiving unit 210 receives a whole image bitstream transmitted from the image compression system and transmits the whole image bitstream to the BMAP reading unit 230. The interface unit 220 includes a keypad for receiving key signals and an interface used for communication with an external device. A user can select an image in a region to be decoded through the interface unit 220.

The BMAP reading unit 230 reads BMAP information from an input bitstream and extracts information on a tile image corresponding to the region to be decoded. Here, the information on the tile image includes the position of a bitstream corresponding to a tile to be decoded in the inputted whole image bitstreams (i.e, the number of bytes per tile). If required, the information on the tile image can include information on the size, scan direction/order and position of each tile. Here, the information on the position represents the position of a display image. That is, the BMAP reading unit 230 reads the BMAP information to detect a tile image to which the image on a region to be decoded belongs or corresponds (this process can be omitted in the case that tile construction information is already included in the decoding system such that the interface unit 220 can figure out which tile image to be decoded). In addition, the BMAP reading unit 230 reads the position of the bitstream corresponding to the tile image in the inputted bitstream.

The tile extracting unit 240 extracts the bitstream corresponding to the tile image using the information on the tile image, which is outputted from the BMAP reading unit 230. The tile decoding unit 250 decodes the extracted tile bitstream and provides the user with an image corresponding to the tile bitstream.

Accordingly, the decoding system according to an embodiment of the present invention can extract a tile image bitstream in a desired region and decode only the extracted tile image bitstream using the BMAP information, to thereby rapidly provide a user-desired image with a small quantity of calculations.

Various methods are used for compressing an input tile image according to embodiments of the present invention, and a method of compressing an image using JPEG will be explained below.

FIG. 8 is a flow chart showing a method of compressing an image using JPEG according to an embodiment of the present invention. Referring to FIG. 8, when an image is inputted in the step S301, the image segmentation unit 110 segments the image into a plurality of tiles in the step S302. Assume that the size of the input image is 1024×1024, and the image segmentation unit 110 segments the image into tiles each of which has the size of 16×16. In other words, the image segmentation unit 110 segments the image into 16×16 tiles.

The encoding unit 120 JPEG-encodes the 16×16 tiles in the step S303. The JPEG-based compression technique can compress an image having an arbitrary size and carries out compression in a minimum unit of a 8×8 block. Thus, in the case of the 16×16 tile, there are four of 8×8 blocks.

The BMAP construction unit 130 calculates the quantity of information generated when the encoding unit 120 JPEG-encodes the tile images in the step S304. Here, the quantity of information generated when the tile images are encoded based on JPEG can be represented by a multiple of 8. Accordingly, the quantity of generated information can be measures in a unit of bytes and thus an actual numerical value can be a byte value generated for each tile. For instance, when the number of bits generated when an arbitrary tile is encoded is 256 bits, which become 32 bytes, and thus the quantity of generated information becomes 32 bytes.

The BMAP construction unit 130 constructs the BMAP information using the quantity of information generated for the tiles in the step S305. Here, since the size of each tile is defined as 16×16, information that must be included in the header information of each tile can include only the number of pixels in horizontal and vertical directions, that is, 16. In the case that the tiles are scanned in the horizontal direction first and then the vertical direction in sequence and this scanning order is defined in the image encoding system and decoding system, no additional information may be included in the tile construction information.

An example of BMAP information when the size of each tile is 16×16 is as follows.

TABLE 3

| 16 | 16 | Number of bytes generated for Tile 1 (100 for example) | ... | Number of bytes generated for Tile N (150 for example) |
|---|---|---|---|---|

In Table 3, the first two blocks represent header information.

The image segmentation unit 110 can segment an input image into tile images each of which has an arbitrary size. Thus, the BMAP information must include the width and the height of each tile image and information on a position of the respective corresponding tile image.

A method of finding a bitstream corresponding to a tile to be decoded in the whole input bitstream using the BMAP information in the case that the BMAP information includes the number of bytes generated for each tile will now be explained.

Assume that the quantity of information of the first tile is 100 bytes, the quantity of information of the second tile is 90 bytes, the quantity of information of the third tile is 130 bytes, the quantity of information of the fourth tile is 80 bytes, and the quantity of information of the Nth tile is 150 bytes. When only the fourth through tenth tiles are displayed, the bitstream corresponding to the third tile is finished at the 320th byte in the entire bitstream (320=100+90+130) and the bitstream corresponding to the fourth tile is finished at the 321th byte through the BMAP information. The finishing point of the tenth tile can be easily drawn, and further, random access can be carried out in a like manner.

The BMAP information generated by the BMAP construction unit 130 is represented by integers. Thus, the binarization unit 140 binarizes the BMAP information so as to be stored and transmitted in the step S306. A typical method of binarizing integers defines a range of maximum value and allocates a specific number of bits to the respective information. When 10 bits are allocated for the number of bytes generated for each tile image, for example, integers up to 1024 can be represented by binary values. However, this method may allocate the number of bits more than actually required. Furthermore, when an integer value larger than the maximum value is generated, additional information for processing the integer value must be transmitted. To solve this problem, unary arithmetic coding can be used. The unary arithmetic coding will now be explained.

When 3, 4 and 2 are coded, for instance, 0s, as many as each value, are arranged, and 1 is finally arranged to binarize random natural number (i.e, 2->001, 3->0001, 4->00001, 10->0000000001).

According to another embodiment of the present invention, the binarization unit 140 can use differential pulse code modulation that obtains a difference between adjacent values in the BMAP information and binarizes the difference. When the number of bytes generated for three tiles are 10, 12 and 11, for example, 10, 2, and −1 are actually binarized and transmitted. When applying the differential pulse code modulation to transmit the difference, a negative difference may be generated. Therefore, unary arithmetic coding is performed on the absolute value of the difference, and 1-bit sign information is added to before or after the absolute value. For example, when the unary arithmetic coded value is a positive number, 1 is added as sign information before the unary arithmetic coded value, and 0 is added before the unary arithmetic coded value when the unary arithmetic coded value is a negative number. In this case, 2 is represented as 1001 and −2 is represented as 0001.

The binarization unit 140 binary-arithmetic-codes the binary numbers generated through the binarization of the BMAP information.

FIG. 9 shows a process of binarizing the BMAP information according to an embodiment of the present invention. As shown in FIG. 9, the header information and the number of bytes generated for each tile image are represented in binary forms and binary-arithmetic-coded to compress the BMAP information.

Here, the binary arithmetic coding process is purposed to reduce the quantity of information on data to be transmitted and, as necessary, the header information and the number of bytes generated for each tile image represented in binary forms can be transmitted without being subjected to the binary arithmetic coding process.

When the binarization of the BMAP information is accomplished, the bitstreams of the BMAP information and the bitstreams of the tile images are combined to form the whole image bitstream in the step S307.

Through the aforementioned process, a single panoramic image can be encoded using the BMAP information, and video information can be encoded when the process is repeated for multiple frames.

FIG. 10 illustrates a bitstream of an image having a plurality of frames.

As shown in FIG. 10, in the case of the image having multiple frames, it is possible to include BMAP information in the respective frame based on JPEG compression and transmit the image.

Hereinafter, a case of applying an image compression method to a spatial scalable video coding method will be described according to another embodiment of the present invention.

The spatial scalable video coding method is a type of motion picture compression method. The spatial scalable video coding method, which transmits video information in an environment where channel capacity is varied, such as the Internet, is for the purpose of transmitting the maximum quantity of video information while adapting to a variation in network channel capacity. A typical standard of the spatial scalable video coding method is MPEG-4 Visual FGS (fine granular scalability).

FIG. 11 is a block diagram of an image compression terminal system according to another embodiment of the present invention.

Referring to FIG. 11, the image compression terminal system includes a down-sampling unit 410, a first encoding unit 420, an up-sampling unit 430, a summing unit 440 and a second encoding unit 450.

The down-sampling unit 410 down-samples an input image. Down-sampling reduces the width and the height of an image, and generally decreases the size of the image by ½ or ¼.

The first encoding unit 420 interframe-codes the down-sampled image. In the case of MPEG-4 Visual FGS standard, the first encoding unit 420 encodes the image according to the conventional MPEG-4 Part 2 Visual standard. A bitstream generated through this process is called "a base layer bitstream." The interframe coding method is well known in the art so that detailed explanation therefor is omitted The up-sampling unit 430 up-samples the base layer bitstream outputted from the first encoding unit 420. Up-sampling is a process of increasing the size of an image.

The summing unit 440 obtains a difference between the input image and the image outputted from the up-sampling unit 430 and outputs the difference as an enhancement layer image.

The second encoding unit 450 encodes the enhancement layer image outputted from the summing unit 440 to generate an enhancement layer image bitstream. The second encoding unit 450 can use a frame-wise compression method without using redundancy between the enhancement layer frames. In other words, compression of the second encoding unit 450 can be considered as an intra coding since the second encoding unit 450 encodes the image only by frames.

The second encoding unit 450 encodes the enhancement layer image such that the BMAP information can be included in the enhancement image. That is, the second encoding unit 450 segments the enhancement image into a plurality of tile images and combines the BMAP information, containing each tile construction information and the quantity of information generated for each tile image, and bitstreams of the tile images so as to output the enhancement layer bitstream.

Accordingly, a user terminal decoding bitstreams to provide an image to a user can read the BMAP information related to the enhancement layer image to decode only a minimum number of tile images to provide the whole image to the user. Therefore, the quantity of calculation can be effectively reduced while carrying out a process of decoding a high-resolution motion picture.

The down-sampled image is encoded through a process of the interframe coding according to the foregoing embodiment, other video compression methods can also be applied thereto as necessary.

FIG. 12 is a block diagram of a receiving terminal that receives an image bitstream to provide an image according to another embodiment of the present invention.

Referring to FIG. 12, the receiving terminal includes a first processing unit 510 for receiving and decoding a base layer bitstream, a second processing unit 520 for receiving and decoding an enhancement layer bitstream, and a summing unit 530.

The first processing unit 510 includes a bitstream receiver 511 for receiving the base layer bitstream, a decoder 512 for decoding the received base layer bitstream, and an up-sampler 513 for up-sampling the decoded data.

The second processing unit 520 includes a bitstream receiver 521 for receiving the enhancement layer bitstream, an interface 522 providing a user interface, a BMAP reading unit 523 for reading BMAP information from the enhancement layer bitstream to extract information on a tile image required for decoding a desired region, a tile extraction unit 524 for receiving the information on the tile image to extract a tile image bitstream from the enhancement layer bitstream, and a decoder 525 for decoding the tile image bitstream.

The summing unit 530 sums up video signals outputted from the first and second processing units 510 and 520.

The receiving terminal having the above-described configuration can decode the whole base layer bitstream which is relatively small in size and, for the enhancement layer bitstream required to be decoded for providing high-resolution image, analyze the BMAP information to decode only a minimum number of tile images, to thereby provide the image of the desired region.

The present invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

The processes according to the present invention can be embodied as computer readable codes on a computer readable recording medium. The computer readable recording medium can be any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (i.e, transmission through the Internet). The computer readable recording medium can also be distributed over a network coupled computer system so that the computer readable code is stored and executed in a distributed fashion.

The invention claimed is:

1. An image compression system comprising:
    a processor and a memory, the memory having stored thereon:
    an image segmentation unit for receiving and segmenting a panoramic image into a plurality of sub-images;
    a first encoding unit for encoding the sub-images to output sub-image bitstreams;
    a BMAP (bitstream map) construction unit for calculating the quantity of information on each sub-image bitstream and generating BMAP information using the calculated quantity of information and information on construction of each sub-image;
    a bitstream combining unit for combining the sub-image bitstreams and the BMAP information to produce a bit stream.

2. The image compression system as claimed in claim 1, further comprising a binarization unit for binarizing the BMAP information generated by the BMAP construction unit and outputting the binarized BMAP information to the bitstream combining unit, the bitstream combining unit combining the sub-image bitstreams and the binarized BMAP information.

3. The image compression system as claimed in claim 2, wherein the binarization unit encodes the binarized BMAP information and outputs it.

4. The image compression system as claimed in claim 2, wherein the binarization unit allocates a predetermined number of bits to the BMAP information and outputs binary numbers corresponding to the BMAP information.

5. The image compression system as claimed in claim 2, wherein the binarization unit carries out a unary arithmetic operation for the BMAP information.

6. The image compression system as claimed in claim 2, wherein the binarization unit differential-pulse-code-modulates the BMAP information and binarizes the differential pulse code modulation result.

7. The image compression system as claimed in claim 1, wherein the bitstream combining unit combines the BMAP information with the head of the sub-image bitstreams.

8. The image compression system as claimed in claim 1, wherein the first encoding unit encodes the sub-images based on JPEG.

9. An image compression system comprising:
a processor and a memory, the memory having stored thereon:
a first encoding unit for receiving and encoding a base-layer panoramic image and outputting it as a first bitstream;
an image segmentation unit for segmenting an enhancement-layer image into a plurality of sub-images, and outputting them;
a second encoding unit for encoding the sub-images output by the image segmentation unit, and outputting them as a second bitstream;
a BMAP (bitstream map) construction unit for calculating an information amount of the second bitstream, using the information amount and configuration information of the sub-images, and generating BMAP information; and
a bitstream combining unit for combining the second bitstream and the BMAP information, and outputting combined data as an enhanced layer bitstream.

10. The image compression system as claimed in claim 9, further comprising:
a down sampling unit for down sampling the input image and outputting the down sampled image as the base-layer image;
an up sampling unit for up sampling the image generated by decoding the first bitstream, and outputting the up sampled image; and
a summing unit for outputting a difference between the input image and the image output by the up sampling unit to the enhancement layer image.

11. The image compression system as claimed in claim 9, wherein the second encoder performs interframe encoding.

12. An image decoding system comprising:
a processor and a memory, the memory having stored thereon:
a bitstream receiving unit for receiving bitstreams of a panoramic image including a plurality of sub-images;
a BMAP reading unit for reading BMAP information included in the bitstreams and outputting information on a sub-image to be decoded among the plurality of sub-images;
a sub-image extracting unit for extracting a bitstream corresponding to the sub-image to be decoded from the bitstreams using the information on the sub-image to be decoded; and
a sub-image decoding unit for decoding the bitstream extracted by the sub-image extracting unit to produce a reconstructed panoramic image.

13. The image decoding system as claimed in claim 12, wherein the BMAP information includes information on construction of each sub-image and the quantity of information of each sub-image bitstream.

14. The image decoding system as claimed in claim 12, further comprising an interface unit for providing interface through which a user selects a region to be decoded from the first image.

15. The image decoding system as claimed in claim 12, wherein the information on the sub-image represents the position in the bitstreams of the first image, which includes the bitstream of the sub-image to be decoded.

16. An image decoding system comprising:
a processor and a memory, the memory having stored thereon:
a first decoding unit for receiving and decoding a bitstream of a base-layer panoramic image, and outputting it;
a BMAP reading unit for reading BMAP information included in the bitstream of an enhancement image including a plurality of sub-images, and outputting information of a sub-image to be decoded from among the sub-images;
a sub-image extracting unit for using information on the sub-image to be decoded, and extracting a bitstream which corresponds to the sub-image to be decoded; and
a second decoding unit for decoding the bitstream extracted by the sub-image extracting unit, and outputting the decoded bitstream as an enhanced layer bitstream.

17. The image decoding system as claimed in claim 16, further comprising an up-sampling unit for up-sampling the output image of the first decoding unit, and a summing unit for summing up the image output from the up-sampling unit and the image output from the second decoding unit.

18. The image decoding system as claimed in claim 16, wherein the second decoding unit carries out interframe decoding.

19. An image compressing method comprising:
providing a processor and a memory, the memory having stored thereon:
(a) receiving and segmenting the first panoramic image into a plurality of sub-images;
(b) encoding the sub-images to generate sub-image bitstreams;
(c) calculating the quantity of information of each sub-image and generating BMAP information using the calculated quantity of information and information on construction of each sub-image;
(d) combining the sub-image bitstreams and the BMAP information to generate frame bitstreams; and
(e) combining the frame bitstreams to form the bitstream of the input image to produce a bit stream.

20. The image compression method as claimed in claim 19, wherein encoding the sub-images to generate sub-image bitstreams comprises:
discrete-cosine-transforming the sub-images; quantizing the discrete-cosine-transformed data; and
entropy-coding the quantized data.

21. The image compression method as claimed in claim 19, wherein combining the sub-image bitstreams and the BMAP information to generate frame bitstreams comprises binarizing the BMAP information and combining the binarized BMAP information and the sub-image bitstreams.

22. An image compression method comprising:
providing a processor and a memory, the memory having stored thereon:
(a) receiving and encoding a base-layer panoramic image and outputting it as a first bitstream;
(b) segmenting an enhancement image into a plurality of sub-images;
(c) encoding the sub-images and outputting them as a second bitstream;

(d) calculating an information amount of the second bitstream, using the information amount and configuration information of the sub-image, and generating BMAP information;

(e) combining the bitstream of the sub-images and the BMAP information to generate frame bitstreams; and (f) combining the frame bitstreams, and outputting combined data as an enhanced layer bitstream.

23. The image compression method as claimed in claim 22, further comprising, before (a), down sampling the input image to generate the base-layer image.

24. The image compression method as claimed in claim 23, further comprising, after (a), outputting a difference between the input image after (a) and the up sampled image generated by decoding the first bitstream to the enhancement image.

25. An image decoding method comprising:
providing a processor and a memory, the memory having stored thereon:
receiving bitstreams of a panoramic image including a plurality of sub-images;
reading information on a sub-image corresponding to a region to be decoded among the plurality of sub-images using BMAP information included in the bitstreams; and
extracting a bitstream corresponding to the sub-image to be decoded from the bitstreams to produce a reconstructed panoramic image.

26. The image decoding method as claimed in claim 25, wherein the BMAP information includes information on construction of each sub-image and the quantity of information of each sub-image bitstream.

27. An image decoding method comprising:
providing a processor and a memory, the memory having stored thereon:
decoding a bitstream of a base-layer panoramic image, and outputting the decoded bitstream;
using BMAP information included in a bitstream of an enhancement layer including a plurality of sub-images, and reading information on a sub-image corresponding to a region to be decoded from among the sub-images;
using information on the sub-image to be decoded, and extracting a bitstream corresponding to the sub-image to be decoded from among the enhancement layer image; and
decoding the extracted bitstream, and outputting the decoded bitstream as an enhanced layer bitstream.

28. A computer-readable storage media storing panoramic image compression program, comprising:
receiving panoramic image including at least one frame;
segmenting the image into a plurality of sub-images;
encoding the sub-images to generate sub-image bitstreams;
calculating the quantity of information of each sub-image bitstream and generating BMAP information using the calculated quantity of information and information on construction of each sub-image; and
combining the sub-image bitstreams and BMAP information to generate frame bitstreams.

29. The recording medium as claimed in claim 28 further comprising combining the frame bitstreams to form the bitstream of the image when the image includes multiple frames.

30. A computer-readable storage media storing panoramic image decoding program, comprising:
receiving bitstreams including a plurality of sub-images;
reading information on a sub-image including a region to be decoded among the plurality of sub-images using BMAP information included in the bitstreams; and
extracting a bitstream corresponding to the sub-image to be decoded from the bitstreams.

31. The recording medium as claimed in claim 30, wherein the BMAP information includes information on construction of each sub-image and the quantity of information of each sub-image bitstream.

* * * * *